United States Patent

[11] 3,543,734

[72] Inventor Joseph Mair
   Leamington Spa, England
[21] Appl. No. 702,033
[22] Filed Jan. 31, 1968
[45] Patented Dec. 1, 1970
[73] Assignee Associated Engineering Limited
   Leamington Spa, England
   a British Company
[32] Priority Feb. 8, 1967
[33] Great Britain
[31] No. 6,101/67

[54] FUEL INJECTION SYSTEMS
   7 Claims, 13 Drawing Figs.
[52] U.S. Cl. .................................................. 123/32,
   123/119
[51] Int. Cl. ...................................................F02m 51/00
[50] Field of Search.......................................... 123/32,
   32(E), 32(E-1), 119, 139.17, 140.3

[56] References Cited
UNITED STATES PATENTS
3,240,191  3/1966  Wallis............................ 123/32E-1
3,429,302  2/1969  Scholl............................ 123/32
3,272,187  9/1966  Westbrook et al............. 123/32E1
3,338,221  8/1967  Scholl............................ 123/32E1

Primary Examiner—Laurence M. Goodridge
Attorney—Holcombe, Wetherill & Brisebois

ABSTRACT: This invention relates to a discriminator circuit for a fuel injection system for an internal combustion engine and which produces an output voltage dependent on engine speed, wherein the discriminator circuit comprises a monostable multivibrator which is triggered to its unstable state by means of trigger pulses occuring at a repetition rate proportional to engine speed, at least one integrator circuit for integrating the output of the multivibrator, and means for producing an output voltage having a desired characteristic in relation to engine speed which can be fed as a control voltage to said fuel injection system.

3,543,734

FUEL INJECTION SYSTEMS

The present invention relates to fuel injection systems for internal combustion engines and more particularly to improvements in fuel injection systems such as are described in U.S. Pat. Nos. 3,272,187 and 3,240,191.

Such systems comprise at least one electromagnetically operated fuel injection valve or injector and a control circuit producing pulses for energising said at least one injection valve, so that the valve or a valve is open for a period depending on the duration of each of the pulses to pass fuel to the engine. The control circuit is fed with at least one variable voltage which varies as a function of one or more parameters of engine operation and which controls the duration of the pulses produced by the control circuit, which in turn are fed to energise the injection valve or valves. As specifically described, the control circuit comprises a monostable multivibrator for producing the electrical pulses and the duration of the pulses is varied by varying two control voltages applied to the timing capacitor circuit of the multivibrator.

One of the control voltages fed to control the control pulse generator may be a voltage dependent on engine speed derived from a discriminator circuit.

It is an object of the present invention to provide an improved form of discriminator circuit for producing an output voltage dependent on engine speed.

The present invention provides a discriminator circuit for producing an output voltage dependent on engine speed comprising a monostable multivibrator which is triggered to its unstable state by means of trigger pulses occurring at a repetition rate proportional to engine speed, said multivibrator producing output pulses of constant width independent of the repetition rate of the triggering pulses, at least one integrator circuit for integrating the output pulses from the multivibrator and producing an output substantially linearly proportional to engine speed and means for producing an output voltage having a desired characteristic in relation to engine speed.

Preferably the circuit includes two integrator circuits, one responsive to produce an output at lower engine speeds and the other responsive to produce an output at higher engine speeds. The or each integrator is connected to an output circuit through a network or networks which in part determine the output characteristic of the discriminator.

The circuit may include means for altering the slope or levels of different parts of the output characteristic.

The invention will now be further described, by way of example, with reference to the accompanying drawings, in which.

Figure 1:
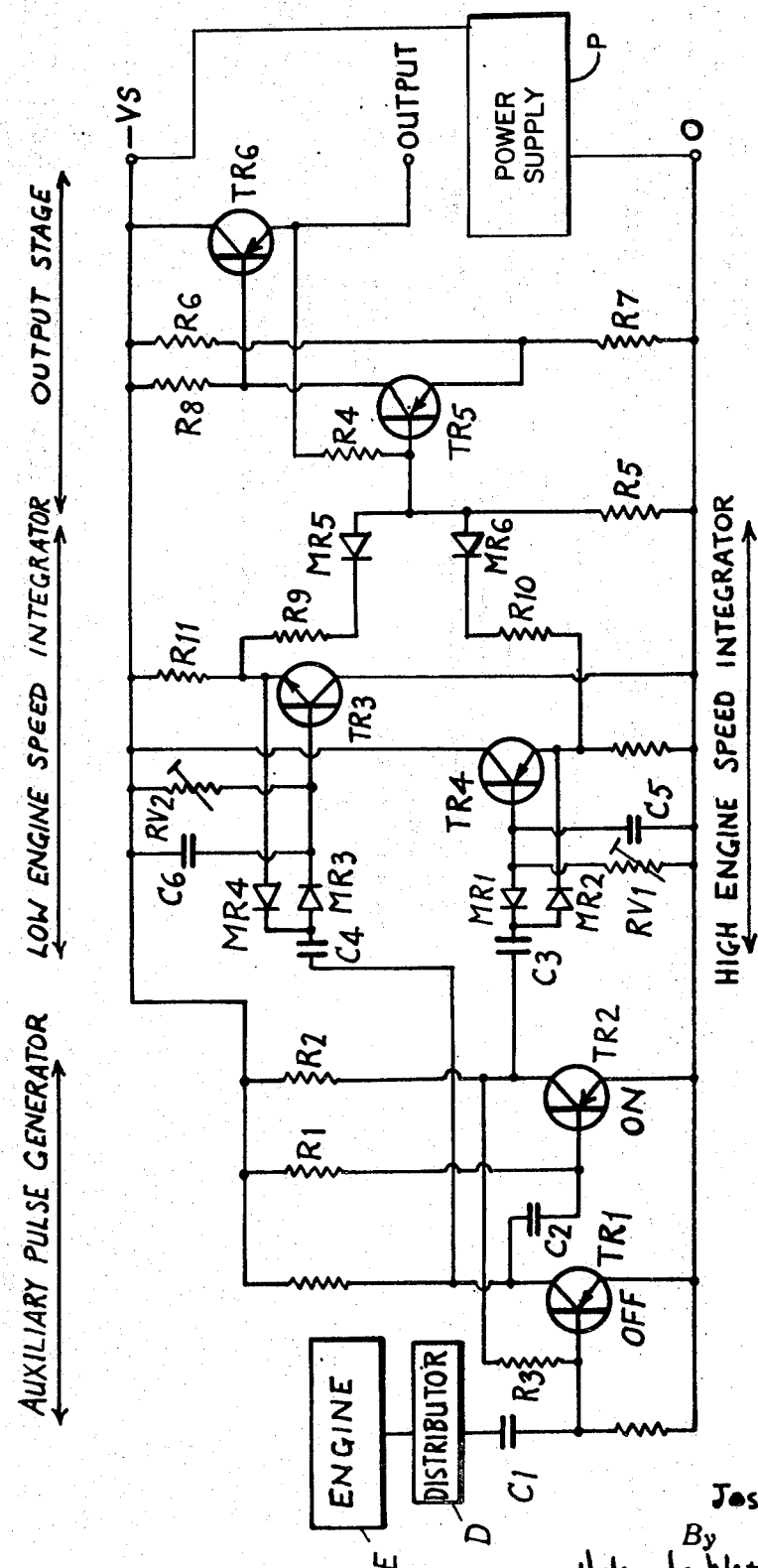
FIG. 1, is the basic circuit diagram of one embodiment of discriminator circuit.

Referring to the circuit of FIG. 1, PNP transistors TR1 and TR2 form a monostable multivibrator. In the quiescent condition TR2 is conducting and TR1 is OFF. When a negative trigger pulse from a source which varies with engine speed, such as the distributor D driven by the engine E, is fed to the base of TR1 via C1, the multivibrator switches over to the condition where TR1 is ON and TR2 is OFF. The negative-going pulse produced at the collector of TR2 is coupled through capacitor C3 to the high speed integrator circuit formed by transistor TR4 and its associated components, whilst a similar positive going pulse at the collector of TR1 is coupled through C4 to the low speed integrator circuit formed by transistor TR3 and its associated components.

After a time governed by the discharge of capacitor C2 through resistor R1, the multivibrator switches back again and the pulse terminates. Since R1 and C2 are constant; the pulse width produced by the multivibrator is constant, irrespective of frequency.

The two integrator circuits incorporating TR3 and TR4 respectively work in similar fashion, except that one is inverted with respect to the other. TR3 is an NPN transistor, whilst TR4 is a PNP transistor.

The high speed integrator circuit produces a negative d.c. output voltage at the emitter of TR4 which increases linearly with the frequency of the pulses in the following manner. For the duration of the pulse from the multivibrator TR2 is turned OFF. Some of the charge on capacitor C3 passes to capacitor C5, the current flow being limited by rectifier MR1 and resistor R2 (or more strictly the parallel combination of R2 and R3). R2 is large enough so that charging current continues to the end of the pulse. Capacitor C5 is 4 or 5 times as large as capacitor C3 so that the change of voltage on C5 at each pulse is only a quarter or a fifth of the change on C3.

At the end of the pulse from the multivibrator, i.e., when TR2 is turn ON again, C3 recharges to approximately its previous condition, due to current flow through TR2, MR2 and TR4, i.e., it is replenished ready for the next transfer of charge into C5.

The circuit reaches equilibrium when the charge removed from C3 during the pulses is balanced by the total charge leaking away through variable resistor RV1 and through the base of TR4 during and between the pulses.

Because C3 is always recharged to the potential between the collector of TR2 and the emitter of TR4 (less the forward voltage drop of MR2) the potential on C3 changes with the output voltage of the integrator, i.e., with the emitter voltage of TR4. Therefore, when a pulse occurs, the applied voltage into the integrator circuit is always a fixed increment over the potential already existing on TR4 emitter and therefore on C5. In other words the amplitude of the pulse is fixed with respect to the potential on C5, not with respect to the common zero-potential line. The amount of charge injected into C5 during a pulse is therefore constant, irrespective of the charge already on C5.

Since the amount of charge injected into C5 for each pulse is constant, and is balanced by the charge leaking away through resistance RV1 (the base current of TR4 being negligible) the circuit produces a voltage across RV1 which is linearly proportional to the frequency of the pulses. The negative d.c. output voltage at the emitter of TR4 thus increases linearly with the pulse frequency.

The low speed integrator circuit produces a similar but positive-going voltage with respect to the negative supply line, at the emitter of TR3.

Figure 2:
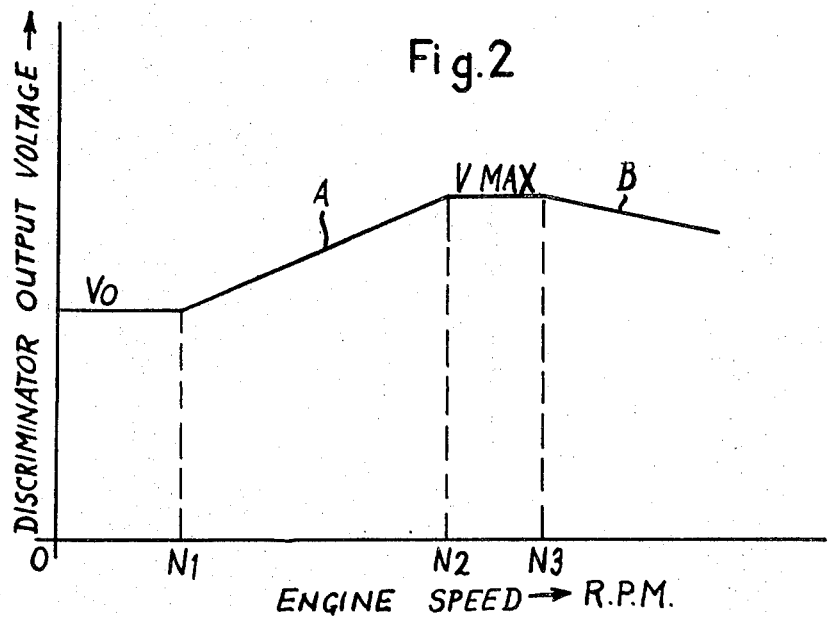
FIG. 2, shows the output characteristic of the discriminator circuit.

PNP transistor TR5 is an amplifier and PNP transistor TR6 is an emitter follower. Feedback via R4 from the emitter of TR6 to the base of TR5 stabilizes the gain of the amplifier. The values of resistors R4, R5, R6 and R7 are chosen so that, in the condition where neither rectifier MR5 nor MR6 is conducting, transistor TR5 is carrying only a very small current. There is therefore very little voltage drop across R8, so that the output voltage derived from the emitter of transistor TR6 is at a maximum. A typical value is 11-volts output when the supply voltage from power supply P is 12 volts. FIG. 2 illustrates a characteristic which can be obtained with the circuit of FIG. 1, and the above-mentioned condition obtains when the characteristic of FIG. 2 is on top plateau Vmax (usually in the 4,000 engine r.p.m. region in practice).

At zero frequency, i.e., with the power switched on but the engine stationary, neither TR3 nor TR4 is conducting. MR6 is inverse biased but current flows through R5, MR5, R9 and R11. This current raises the potential at the base of TR5 which turns ON, lowering the potential at its collector and thus reducing the output voltage at the emitter of TR6. The circuit reaches an equilibrium position when the current through MR5, R9 and R11 is balanced by a reduction in the current through R4. Thus, the more current taken through MR5 etc. the lower is the output voltage. The level of the low speed plateau Vo of FIG. 2 is therefore set by the value of the sum of R9 and R11. The lower the total resistance of these two resistors, the lower is the value of discriminator output.

When the engine is started and speed builds up, a potential proportional to speed is developed on capacitor C6 in the low speed integrator circuit. At some speed, (N1 in FIG. 2) this potential will be high enough for TR3 to begin to conduct. As the speed increases further TR3 is turned further ON so that the current through MR5 and R9 falls and the discriminator output rises (slope A). Eventually MR5 and R9 are taking no current and the discriminator output is at its maximum, Vmax.

The speed N2 at which the characteristic first reaches the top plateau is determined by the value of variable resistor RV2. The proportion of this speed at which TR3 begins to conduct and so to raise the characteristic from its lower plateau is determined by the original potential on the emitter of TR3, i.e., by the ratio of R11 to R9. Thus $N1/N2 \simeq R11/(R9+R11)$.

At some still higher speed along the top plateau RV1 will be set so that the high speed integrator begins to take current through MR6 and R10. At this speed N3 the discriminator output begins to drop (slope B). The rate of rise of the high speed integrator voltage is now fixed, but the effect that this increasing voltage has on the amplifier is determined by the value of R10. The lower the value of R10 the greater is the current taken from the amplifier circuit and therefore the greater is the rate of reduction of discriminator output voltage with increasing speed.

The control voltage at the output of transistor TR6 can be used as the supply voltage for the manifold pressure transducer in the computer network shown in FIG. 3 of the fuel injection system disclosed in U.S. Pat. No. 3,272,187 instead of supplying the manifold pressure transducer from a d.c. supply. With such an arrangement the discriminator output voltage dependent on engine speed forms a component of the control voltage V1 fed to the pulse generator circuit of FIG. 2 of that application.

FIG. 3 shows a variety of further discriminator characteristics which can be derived from either the basic circuit or from simple modifications. These curves are related to the breathing characteristics of an engine and the curve developed in any individual case is chosen to suit a particular engine design. In the curves of FIG. 3, the broken lines represent the individual characteristics of the two integrator circuits, and the solid line represents the output characteristic of the discriminator.

Figure 3A:
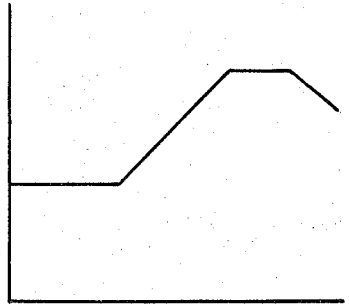
FIG. 3, shows a series of alternative characteristics which can be obtained.
Figure 3B:
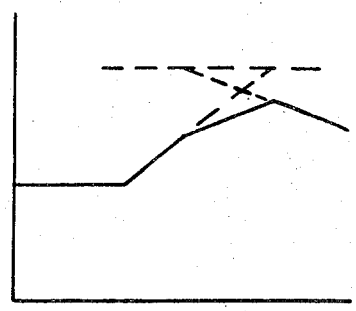
Figure 3C:
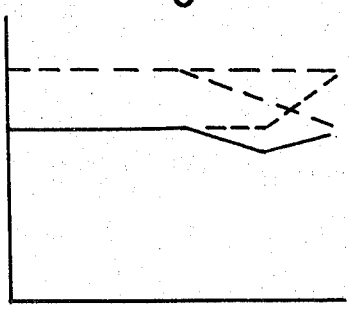

FIG. 3a is the basic characteristic as shown in FIG. 2. If the two integrator circuits are set to have an overlapping action then the top plateau is never reached and a characteristic like 3b results. Taking this effect to the extreme, a characteristic like 3c can be produced by starting the slope down before the slope-up begins.

Figure 3D:
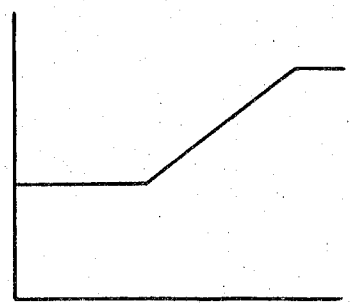
Figure 3E:
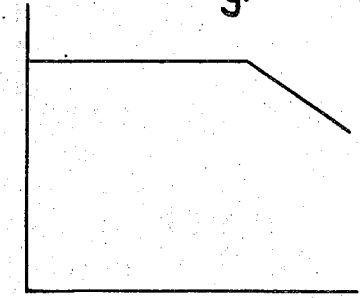
Figure 3F:
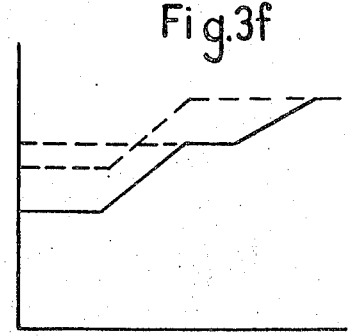
Figure 3G:
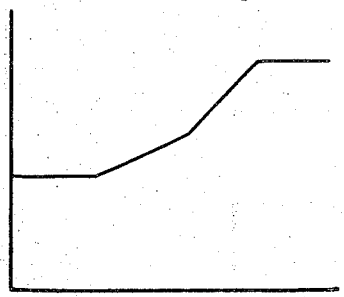
Figure 3H:
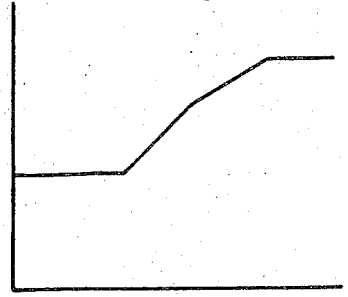
Figure 3J:
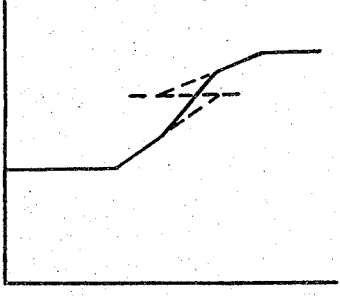
Figure 3K:
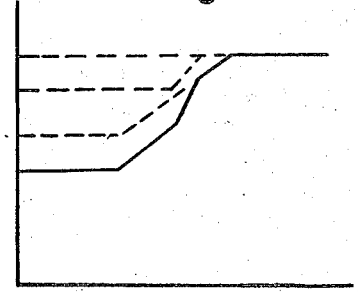
Figure 3L:
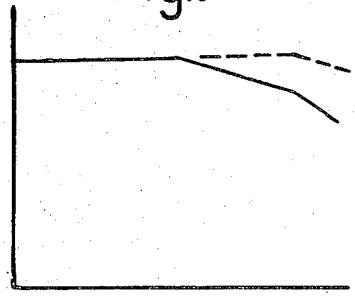

Simpler laws can be derived by omitting one of the integrator circuits completely e.g., in FIG. 3d the high speed integrator has been omitted, while in FIG. 3e the low speed integrator has been omitted.

Other laws can be produced by modification of the circuit connections. It is possible, for instance, to invert the high speed integrator circuit of TR4 and make it an exact duplicate (except for component values) of the low speed integrator circuit of TR3. This gives a discriminator characteristic like 3f. By suitable choice of components the intermediate plateau can be reduced to zero to give the characteristics of 3g or 3h, or the two up slopes can overlap to give characteristics of 3j or 3k.

Conversely the circuit of TR3 can be inverted to give a second high speed integrator. The discriminator will then have a characteristic like 3l.

In order to improve the stability of the characteristic obtained from the discriminator with changes in supply voltage, and with temperature, a rectifier may be connected in series between like 3l.

In order to improve the stability of the characteristic obtained from the discriminator with changes in supply voltage, and with temperature, a rectifier may be connected in series with resistor R6 of the emitter potential divider for transistor TR5 and a further rectifier connected in series between rectifiers MR5 and MR6 and the base of TR5. Further stability of the characteristic may be obtained by supplying the monostable multivibrator from a potential divider including a zener diode and temperature compensation may be achieved by connecting a thermistor in the discharge path for capacitor C2.

I claim:

1. In a fuel injection system for an internal combustion engine, comprising at least one electromagnetically operated fuel injector and a control circuit producing pulses for energising said at least one injector so that the injector or an injector is open for a period depending on the duration of each of the pulses to pass fuel to the engine, and a discriminator circuit for producing an output voltage dependent on engine speed which is applied as a variable voltage to said control circuit to control the duration of the pulses produced by said control circuit, the improvement wherein said discriminator circuit comprises:

a monostable multivibrator;

means for triggering said monostable multivibrator to its unstable state by means of trigger pulses occurring at a repetition rate proportional to engine speed;

means for deriving from said multivibrator output pulses of constant width independent of the repetition rate of the triggering pulses;

at least one integrator circuit for integrating the output pulses from the multivibrator and producing an output substantially linearly proportional to engine speed, said integrator circuit includes a transistor in combination with a capacitor and a resistor, and means for injecting a constant amount of charge into the capacitor during a pulse from the monostable multivibrator, and said capacitor produces a control voltage for said transistor;

means acting on the output of the integrator circuit, which means includes an amplifier feeding an emitter follower output circuit, and the input voltage for the amplifier is delivered through a network including a resistor controlling the output of the integrator circuit, the output voltage of the emitter follower output circuit being a d.c. voltage and having a desired characteristic in relation to engine speed; and means for applying said output voltage as said variable voltage to the control circuit.

2. A system as claimed in claim 1, wherein said discriminator circuit includes a first integrator circuit responsive to produce an output at lower engine speeds and a second integrator circuit responsive to produce an output at higher engine speeds, means for deriving two output pulses from the monostable multivibrator when it is in its unstable state which are respectively fed to the first and second integrator circuits, and means including said network for combining the outputs from the two integrator circuits to produce the output characteristic of the discriminator circuit.

3. A system as claimed in claim 1, wherein said at least one integrator circuit includes a variable resistor for varying the output characteristic obtained from the discriminator circuit.

4. In a fuel injection system for an internal combustion engine, comprising at least one electromagnetically operated fuel injector and a control circuit producing pulses for energising said at least one injector so that the injector or an injector is open for a period depending on the duration of each of the pulses to pass fuel to the engine, and a discriminator circuit for producing an output voltage dependent on engine speed which is applied as a variable voltage to said control circuit to control the duration of the pulses produced by said control circuit, the improvement wherein said discriminator circuit comprises:

a monostable multivibrator;

means for triggering said monostable multivibrator to its unstable state by means of trigger pulses occurring at a repetition rate proportional to engine speed;

means for deriving two output pulses of constant width, which is independent of the repetition rate of the trigger pulses, from said multivibrator when it is in its unstable state;

a first integrator circuit responsive to produce a d.c. output voltage at lower engine speeds, which is substantially linearly dependent upon engine speed;

a second integrator circuit responsive to produce a d.c. output voltage at higher engine speeds, which is substantially linearly dependent upon engine speed;

means to deliver the output pulses from said multivibrator to the first and the second integrator circuit, respectively;

means for combining the output voltages from both integrator circuits to produce a d.c. voltage having a desired characteristic in relation to engine speed; and means for applying said d.c. voltage as said variable voltage to the control circuit.

5. A system as claimed in claim 4, wherein each of said integrator circuits includes a transistor in combination with a capacitor and a resistor and means for injecting a constant amount of charge into the capacitor during a pulse from the monostable multivibrator, and said capacitor produces a control voltage for said transistor.

6. A system as claimed in claim 4, wherein the means for combining the output voltages from both integrator circuits includes an amplifier feeding an emitter follower output circuit, and the input voltage for the amplifier is delivered through a network including a resistor for each integrator circuit controlling these d.c. output voltages, respectively.

7. A system as claimed in claim 4, wherein at least one integrator circuit includes a variable resistor for varying the output characteristics obtained from the discriminator circuit.